United States Patent Office 3,806,472
Patented Apr. 23, 1974

3,806,472
PERFUME COMPOSITION CONTAINING HYDROGENATED INDANE DERIVATIVE
John B. Hall, Rumson, N.J., assignor to International Flavors & Fragrances Inc., New York, N.Y.
No Drawing. Application Feb. 16, 1971, Ser. No. 115,834, now U.S. Patent No. 3,751,500, which is a division of Ser. No. 851,086, Aug. 18, 1969, now Patent No. 3,636,176. Divided and this application Sept. 7, 1972, Ser. No. 286,994
Int. Cl. C11b 9/00; A61k 7/00
U.S. Cl. 252—522
1 Claim

ABSTRACT OF THE DISCLOSURE

A perfume composition containing a hydrogenated indane derivative having the formula:

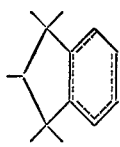

wherein the dashed lines represent single or double bonds, no more than two of the dashed lines represent double bonds and, when two double bonds are present, such bonds are unconjugated.

---

This application is a division of applicant's copending parent application Ser. No. 115,834, filed on Feb. 16, 1971, now U.S. Pat. 3,751,500 which, in turn, is a division of Ser. No. 851,086, filed on Aug. 18, 1969, now U.S. Pat. 3,636,176.

BACKGROUND OF THE INVENTION

There is a continuing need for fragrance materials having persistent amber woody odors with satisfactory overtones or qualities. While many natural products have amber woody fragrances, the more desirable of these are frequently in short supply and hence difficult to obtain and expensive. Moreover, it is also most desirable that such amber woody fragrance character have good persistence so that the substances can be used in quality formulations for perfume or other olfactory compositions. Such materials should also possess good blending qualities so that they are useful in preparing perfume compositions.

THE INVENTION

Briefly, the present invention provides a novel hydrogenated indane derivative, 4,5-dihydro-1,1,2,3,3-pentamethylindane, having the formula:

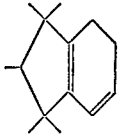

This substance has a strong, persistent, woody amber odor with various elegant piney overtones. Thus the present invention also provides novel perfume and fragrance compositions containing such hydrogenated indane, and processes for producing such indane are also disclosed herein.

The invention also contemplates 5,7a-dihydro-1,1,2,3,3-pentamethylindane having the formula:

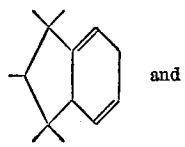

and 3a,4-dihydro-1,1,2,3,3-pentamethylindane having the formula:

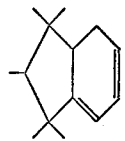

Such isomeric dihydroindanes are also useful in the formulation of olfactory compositions.

The present invention further contemplates 4,5,6,7-tetrahydro - 1,1,2,3,3 - pentamethylindane having the formula:

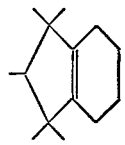

and hexahydro - 1,1,2,3,3 - pentamethylindane having the formula:

These materials are useful in preparing a variety of perfume compositions, as taught hereinafter.

It will be appreciated by those skilled in the art from the present disclosure that the indane derivatives according to this invention can exist in several stereoisomeric forms, and it is contemplated that the formula given herein includes the several isomeric forms.

A convenient starting material according to the present invention is pentamethylindane. In one aspect, the pentamethylindane is hydrogenated to provide the tetrahydro derivative and/or the hexahydro derivative as the first step in the synthesis. In this synthesis the bridge double bond of the tetrahydro derivative is then oxidized with a suitable agent to obtain the epoxyindane.

The hexahydro derivative can be dehydrogenated if desired to obtain the 1,1,2,3,3-pentamethylindane for recycling or for other syntheses. Such dehydrogenation can also provide a useful fragrance material.

For the tetrahydro derivative, the hydrogenation is carried out under controlled conditions to add two moles of hydrogen to each mole of the indane. It is preferred to use metallic catalysts such as Raney nickel or noble metals such as palladium, rhodium, and the like. Such catalysts can be supported on carriers such as carbon and the like.

The hydrogenation is carried out at substantially superatmospheric pressures of from 50 to 200 atmospheres, and is preferably carried out at 60 to 130 atmospheres. The reaction is desirably carried out at temperatures in excess of 100° C. up to 225° C., and a preferred temperature range is 150° to 190° C. The hexahydro derivative is obtained under these same conditions through the addition of three moles of hydrogen.

In one aspect, the 4,5,6,7-tetrahydropentamethylindane so obtained is oxidized to provide the epoxy oxygen substituent on the 3a,7a bridge carbon atoms. The oxidation is carried out with an oxidizer such as percarboxylic acid. Thus, peracids such as peracetic, perpropionic, perbenzoic, perphthalic, and the like are used. In preferred embodiments of the process, lower aliphatic percarboxylic acids are used. Thus, peracetic acid can be used, although a combination of acetic anhydride and hydrogen peroxide is equivalent. The amount of percarboxylic acid used should be about stoichiometric, although slight excesses up to about ten molar percent can be used. An alkali metal salt of the corresponding carboxylic acid, e.g., sodium acetate for peracetic acid, is desirably used to buffer the reaction mixture.

The dihydropentamethylindane is formed by refluxing the epoxide as prepared above with sulfuric acid or a sulfonic acid agent such as benzenesulfonic acid, p-toluenesulfonic acid, methanesulfonic acid, and the like or a Lewis acid such as boron trifluoride, boron trifluoride-etherate, and the like. Such agent is present in catalytic amounts.

This reaction can be carried out at pressures above or below atmospheric, but atmospheric pressure is desired to minimize ebullition of any reaction vehicle and provide an acceptable reaction rate, while maintaining control over the reaction. The temperatures used are in the range of 15° to 120° C., depending upon the catalyst used.

The reaction is suitably carried out in the presence of a vehicle, and solvents for the epoxide and agent are desirable. Such reaction vehicles include aromatic hydrocarbons such as benzene, toluene, xylene, and the like, and benzene is a preferred vehicle.

Other dihydro derivatives can be produced directly from the pentamethylindane or by isomerization of the 4,5-dihydro derivative described above. Thus, the pentamethylindane can be treated with an alkali metal, desirably lithium, in liquid or gaseous ammonia also to provide the 5,7a-dihydro derivatives. Such treatment is carried out at temperatures of from about −40° C. to about 25° C. At the lower temperature atmosperic or slightly subatmospheric pressures can be used. With liquid ammonia at the higher temperatures, superatmospheric pressures up to about five atmospheres are used. Reaction times of from 15 minutes to four hours can be used.

The conjugated 3a,4 dihydro derivative is produced from the non-conjugated material by treatment with an alkali metal, preferably lithium, in an alkylamine, desirably a lower alkylamine such as ethylamine and the like. While it can be conducted at sub- or superatmospheric pressures, the reaction is desirably carried out at atmospheric pressures. Temperatures of 10° to 17° C. are used, and the time is from 30 minutes to four hours.

The hydrocarbons produced according to the above reaction schemes can be separated from the vehicle and any unreacted materials or unwanted by-products removed by conventional means including washing, distillation, extraction, preparative chromatography, and the like. It is preferred to fractionally distill the washed reaction product under a relatively high vacuum so as to obtain a pure product. Product purities of 80% are readily obtained, and much higher purities can also be provided by suitable treatment. All parts, proportions, percentages and ratios herein are by weight unless otherwise indicated.

The dihydropentamethylindanes of this invention are useful as fragrances. They can be used to contribute a woody amber fragrance. As olfactory agents the indane derivatives of this invention can be formulated into or used as components of a "perfume composition."

The term "perfume composition" is used herein to mean a mixture of organic compounds, including, for example, alcohols, aldehydes, ketones, esters, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by highlighting or moderatnig the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 2% by weight of the compounds of this invention, or even less, can be used to impart a woody amber odor to soaps, cosmetics, and other products. The amount employed can range up to 7% or higher and will depend on considerations of cost, nature of the end product, the effect desired on the finished product and the particular fragrance sought.

The indane derivatives of this invention can be used alone or in a perfume composition as an olfactory component in detergents and soaps; space deodorants; perfumes; colognes; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.011% of the novel hydrocarbon will suffice to impart a fine woody amber odor.

In addition, the perfume composition can contain a vehicle or carrier for the other ingredients. The vehicle can be a liquid such as alcohol, glycol, or the like. The carrier can be an absorbent solid such as a gum or components for encapsulating the composition.

It will be appreciated that the pentamethylindane derivatives according to this invention can be used to enhance, modify, or supplement the fragrance properties of natural or synthetic fragrance compositions. Thus, such preferred dihydroindanes can be used in fragrance compositions for addition to perfume compositions or directly to products such as soap, detergents, cosmetics, and the like. The fragrance compositions so prepared do not entirely provide the olfactory properties to the finished perfume or other article, but they do furnish a substantial part of the overall fragrance impression.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 4,5,6,7-tetrahydro-1,1,2,3,3-pentamethylindane and hexahydro-1,1,2,3,3-pentamethylindane The following ingredients are charged into a stainless steel five-liter autoclave equipped with a hydrogen gas feed:

1,800 g. (8.14 moles) of 1,1,2,3,3-pentamethylindane (85% pure)
90 g. of Raney nickel.

Enough hydrogen is fed into the autoclave to raise the pressure to 1,000 p.s.i.g. The hydrogen feed is continuous until two moles of hydrogen are absorbed, and the autoclave is heated to a temperature in the range of 150–185° C. over a period of about 8 hours until an amount of $H_2$ equal to 10% in excess of theory is absorbed. During this time the pressure in the autoclave is maintained at 1,500 p.s.i.g.

The 1,641 g. of crude product removed from the autoclave is distilled on a 12-inch Goodloe column after being mixed with 10.0 g. of Primol mineral oil. The distillate is recovered in two fractions.

Fraction I: Distills at a temperature of 80° C. and 4.0 mm. Hg to provide 401 g. of 4,5,6,7-tetrahydro-1,1,2,3,3-pentamethylindane.

Fraction II: Distills at a temperature range of 86–88° C. and 3.5–3.8 mm. Hg to provide 729 grams of hexahydro-1,1,2,3,3-pentamethylindane.

A sample of Fraction I is further refined on a six-foot by ¾ inch gas liquid chromatographic (GLC) column containing 20% Carbowax polyethylene glycol and operated at 110° C. Analysis by infrared (IR) and proton magnetic resonance (PMR) confirms the structure:

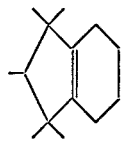

Fraction II is further refined in a similar manner and analysis confirms the structure:

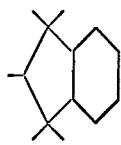

EXAMPLE II (a) Production of 3a,7a-epoxyhexahydro-1,1,2,3,3-pentamethylindane Into a 250-ml. flask equipped with thermometer, stirrer, reflux condenser and ice bath are introduced 194 g. of the tetrahydroindane produced in Example I and 15 g. of sodium acetate. At 25–30° C., 124 g. of 40% peracetic acid (0.65 mole) is added during four hours. After addition is completed, an equal volume of water is added to the reaction mass. The aqueous phase is separated from the organic phase and extracted with 150 ml. of toluene. The toluene extract is combined with the organic phase and washed with one volume of 5% aqueous sodium hydroxide solution and then with one volume of water.

The solvent is stripped off leaving a crude product weighing 208 g. The crude epoxy product is distilled on a 12-inch Goodloe column after addition of 4.0 g. of triethanolamine at 72–74° C. and 1.0–1.4 mm. Hg. PMR and IR analysis of this material confirm the structure:

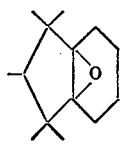

(b) Production of 4,5-dihydro-1,1,2,3,3-pentamethylindane

Into a 100 ml. reaction flask fitted with thermometer and reflux condenser are introduced 10 g. of the epoxyhexahydroindane produced above, 50 ml. benzene, and 0.5 g. of p-toluensulfonic acid. The reaction mass is stirred for two hours at 20–30° C. and then refluxed for one hour.

The reaction mass is subsequently washed with a saturated aqueous sodium bicarbonate solution followed by one volume of a 5% sodium chloride solution and dried over anhydrous sodium sulfate. The resulting product is separated on a gas-liquid chromatographic (GLC) column and the various separated constituents are analyzed by PMR, mass, infrared and UV absorption spectroscopy. These analyses confirm the identity of 4,5-dihydro-1,1,2,3,3-pentamethylindane having the structure:

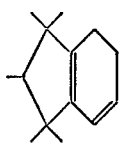

This material has a fine woody, amber-tobacco aroma with an elegant piney note.

EXAMPLE III

Preparation of soap composition

A total of 100 g. of soap chips (from a toilet soap prepared from tallow and coconut oil) is mixed with one gram of the perfume composition given below until a substantially homogeneous composition is obtained. The soap composition manifests a characteristic woody-amber odor with piney overtones.

The perfume composition comprises the following ingredients:

| Ingredient: | Parts |
|---|---|
| Vetivert oil | 40 |
| Dihydropentamethylindane produced in Example II | 60 |
| Sandalwood oil | 100 |
| Rose Geranium oil | 200 |
| Musk extract (3%) | 25 |
| Civet extract (3%) | 25 |
| Benzyl iso-eugenol | 100 |
| Coumarin | 100 |
| Heliotropin | 50 |
| Bois de Rose oil | 200 |
| Benzoin resin | 100 |
| | 1,000 |

EXAMPLE IV

Preparation of a detergent composition

A total of 100 grams of a detergent powder is mixed with 0.15 gram of the perfume composition as set forth in Example III until a substantially homogeneous composition having a woody-amber odor is obtained.

EXAMPLE V

Preparation of a cosmetic powder composition

A cosmetic powder is prepared by mixing 100 grams of talcum powder with 0.25 gram of the dihydroindane obtained from the process of Example II in a ball mill. The cosmetic powder has a desirable woody-amber odor.

EXAMPLE VI

Liquid detergent

Concentrated liquid detergents with a woody-amber, piney odor are prepared containing 0.1%, 0.15%, and 0.20% of the dihydroindane produced in Example II. They are prepared by adding and homogeneously mixing the appropriate quantity of the compound to Ultra Chemical Company's P–87 liquid detergent.

EXAMPLE VII

A 100-ml. reaction flask is fitted with a mechanical stirrer, condenser, and thermometer, and 2.5 g. of hexahydropentamethylindane as produced in Example I and 2.5 g. of palladium on carbon catalyst containing 10% palladium are charged to the flask. The flask contents are brought to 234° C. and refluxed at that temperature for two hours until no further reaction is evident.

The catalyst is then filtered off and the filtrate is analyzed. The product obtained is largely 1,1,2,3,3-pentamethylindane.

EXAMPLE VIII 1,1,2,3,3 - pentamethylindane is treated with lithium in ammonia for thirty minutes at −33° C. The product is analyzed and found to contain 5,7a-dihydro-1,1,2,3,3-pentamethylindane. The dihydroindane so produced has an amber woody fragrance character suitable for incorporation into perfume compositions such as that set forth in Example III.

EXAMPLE IX

An aliquot of the dihydroindane derivative produced in Example VIII is treated by dissolving lithium in ethylamine until the blue color disappears from the mass and then adding the dihydro material with stirring and continuing the stirring under reflux for one hour.

The ethylamine is evaporated, water is added, and the aqueous mixture is extracted with hexane. The product is found to contain 3a,4 - dihydro - 1,1,2,3,3 - pentamethylindane. This has an amber woody fragrance character suitable for incorporation into perfume compositions such as that set forth in Example III.

What is claimed is:

1. A perfume composition containing as an essential ingredient a fragrance imparting amount of at least one indane derivative selected from the group consisting of 5,7a - dihydro - 1,1,2,3,3 - pentamethylindane; 3a, 4-dihydro - 1,1,2,3,3 - pentamethylindane; 4,5,6,7 - tetrahydro-1,1,2,3,3-pentamethylindane; and hexahydro-1,1,2,3,3-pentamethylindane and an auxiliary perfume ingredient.

References Cited
UNITED STATES PATENTS

| | | | |
|---|---|---|---|
| 2,249,987 | 7/1941 | Stanley | 260—666 P |
| 3,183,249 | 5/1965 | Wiese | 260—666 PY |
| 3,681,464 | 8/1972 | Theimer | 252—522 |

ALBERT T. MEYERS, Primary Examiner

A. P. FAGELSON, Assistant Examiner

U.S. Cl. X.R.

424—69